US011140153B2

(12) United States Patent
Lupien et al.

(10) Patent No.: US 11,140,153 B2
(45) Date of Patent: *Oct. 5, 2021

(54) TECHNIQUES FOR IDENTIFICATION OF LOCATION OF RELEVANT FIELDS IN A CREDENTIAL-SEEKING WEB PAGE

(71) Applicant: McAfee, LLC, Santa Clara, CA (US)

(72) Inventors: Nicolas Lupien, Montreal (CA);
Michael Lakhia, Montreal (CA);
Hubert Gagnon-Lamonde, Montreal (CA)

(73) Assignee: MCAFEE, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,456

(22) Filed: Sep. 16, 2019

(65) Prior Publication Data

US 2020/0084199 A1 Mar. 12, 2020

Related U.S. Application Data

(63) Continuation of application No. 14/928,925, filed on Oct. 30, 2015, now Pat. No. 10,419,423.

(51) Int. Cl.
*H04L 29/06* (2006.01)
*G06F 16/22* (2019.01)
(Continued)

(52) U.S. Cl.
CPC ........ *H04L 63/083* (2013.01); *G06F 16/2246* (2019.01); *G06F 16/986* (2019.01);
(Continued)

(58) Field of Classification Search
CPC ... H04L 63/083; H04L 63/102; G06F 17/243; G06F 17/30327; G06F 21/31;
(Continued)

(56) References Cited

U.S. PATENT DOCUMENTS 8,607,306 B1 * 12/2013 Bridge .................... H04L 63/08
726/1
9,064,028 B2 6/2015 Shen et al.
(Continued)

FOREIGN PATENT DOCUMENTS

KR 20120051419 5/2012
WO 2014075509 5/2014

OTHER PUBLICATIONS

United States Patent and Trademark Office, "Non-Final Office Action," issued in connection with U.S. Appl. No. 14/928,925, dated Mar. 16, 2017, 15 pages. (Not provided as this is a USPTO document. Applicant will provide document upon request from Examiner.).

(Continued)

*Primary Examiner* — Joseph P Hirl
*Assistant Examiner* — Chi D Nguy
(74) *Attorney, Agent, or Firm* — Hanley, Flight & Zimmerman, LLC (57) ABSTRACT

Techniques allow identification of credential fields in a credential form on a web page that can be stored in a credential manager database to allow a credential manager application to fill the credential fields with saved credentials managed by the credential manager.

18 Claims, 6 Drawing Sheets

(51) Int. Cl.
*G06F 16/958* (2019.01)
*G06F 21/31* (2013.01)
*G06F 40/174* (2020.01)

(52) U.S. Cl.
CPC ............ *G06F 21/31* (2013.01); *G06F 40/174* (2020.01); *H04L 63/102* (2013.01); *G06F 2221/2133* (2013.01)

(58) Field of Classification Search
CPC ............... G06F 16/2246; G06F 16/986; G06F 2221/2133; G06F 40/174
See application file for complete search history.

(56) References Cited

U.S. PATENT DOCUMENTS

| | | | |
|---|---|---|---|
| 9,092,335 B2* | 7/2015 | Surtani | G06F 12/0802 |
| 2004/0024812 A1* | 2/2004 | Park | G06F 16/972 |
| | | | 709/203 |
| 2004/0158746 A1* | 8/2004 | Hu | G06F 21/41 |
| | | | 726/8 |
| 2005/0183003 A1 | 8/2005 | Peri | |
| 2011/0302198 A1* | 12/2011 | Baby | G06F 16/2465 |
| | | | 707/769 |
| 2013/0138655 A1 | 5/2013 | Yan et al. | |
| 2014/0022792 A1 | 1/2014 | Safavi et al. | |
| 2014/0282116 A1* | 9/2014 | Kosobucki | G06F 16/951 |
| | | | 715/760 |
| 2014/0310805 A1* | 10/2014 | Kandekar | H04L 63/083 |
| | | | 726/19 |
| 2014/0372701 A1 | 12/2014 | Komaromy et al. | |
| 2014/0372861 A1 | 12/2014 | Lawless et al. | |
| 2015/0067763 A1 | 3/2015 | Dalcher et al. | |
| 2015/0135290 A1 | 5/2015 | Newman | |
| 2016/0080360 A1* | 3/2016 | Child | G06F 21/41 |
| | | | 726/6 |

OTHER PUBLICATIONS

United States Patent and Trademark Office, "Non-Final Office Action," issued in connection with U.S. Appl. No. 14/928,925, dated Oct. 5, 2018, 14 pages. (Not provided as this is a USPTO document. Applicant will provide document upon request from Examiner.).

United States Patent and Trademark Office, "Final Office Action," issued in connection with U.S. Appl. No. 14/928,925, dated Oct. 20, 2017, 15 pages. (Not provided as this is a USPTO document. Applicant will provide document upon request from Examiner.).

United States Patent and Trademark Office, "Notice of Allowance," issued in connection with U.S. Appl. No. 14/928,925, dated May 3, 2019, 9 pages. (Not provided as this is a USPTO document. Applicant will provide document upon request from Examiner.).

Philippe Le Hegaret, Lauren Wood, Jonathan Robie, "What is the Document Object Model?", Nov. 13, 2000, W3C, pp. 1-6.

International Bureau, "International Preliminary Report on Patentability," issued in connection with application No. PCT/US2016/053238, dated May 1, 2018, 22 pages.

International Bureau, "Search Report and Written Opinion," issued in connection with application No. PCT/US2016/053238, dated Jan. 16, 2017, 13 pages.

\* cited by examiner

TECHNIQUES FOR IDENTIFICATION OF LOCATION OF RELEVANT FIELDS IN A CREDENTIAL-SEEKING WEB PAGE

RELATED APPLICATION

This patent arises from a continuation of U.S. patent application Ser. No. 14/928,925, entitled "TECHNIQUES FOR IDENTIFICATION OF LOCATION OF RELEVANT FIELDS IN A CREDENTIAL-SEEKING WEB PAGE," filed Oct. 30, 2015. Priority to U.S. patent application Ser. No. 14/928,925 is claimed. U.S. patent application Ser. No. 14/928,925 is hereby incorporated by reference in its entirety.

TECHNICAL FIELD

Embodiments described herein generally relate to credential management systems, and in particular to techniques for identification of the location of relevant fields in a credential-seeking web page.

BACKGROUND ART

Users typically maintain a number of web-based accounts to personalize a web experience. Examples of such web-based accounts include email accounts, online shopping accounts, online banking accounts, online brokerage accounts, and the like. Most accounts may be accessed in a web browser over a personal computer, mobile device, smart device or other personal device as users may find it convenient to access these accounts on their personal devices when they are away from a desk or home computer. Each web-based account (referred to herein as a web account) requires a user to provide a username, a password, and/or other user credentials in, for example, a web browser to provide access to the web account. Each web account may present, in a web page, a web form to the user during initial login and subsequent access to the web account. This web form is a structured document that includes "form fields" for entering user identifier or credential information, such as a user ID (a user identifier), a password, or the like.

Today, credential manager applications that provide the ability to store user credentials and for later use for logging a user into the user's online accounts using web pages received over the internet. These applications log the user into the online account by entering user credentials in one or more fields in a web form that is received in the web page. However, those fields must be identified or located before the credential manager can fill those fields.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

As used herein, the term "medium" can refer to a single physical medium on which information is stored or a collection of physical media that together store the information.

Web pages are written in a markup language that defines elements of the page, typically HyperText Markup Language (HTML) or Extensible HyperText Markup Language (XHTML). Cascading Style Sheets (CSS) is a style sheet language used for describing the presentation of a document written in a markup language, including HTML or XHTML, but also including Extensible Markup Language (XML). The CSS provides formatting instructions for each matching HTML element. Each HTML element is a individual component of an HTML document or web page, once the HTML document has been parsed into the Document Object Model (DOM).

The Document Object Model (DOM) is a cross-platform and language-independent convention for representing and interacting with objects in HTML, XHTML, and XML documents. The nodes or objects of every document are organized into a tree structure, called the DOM tree, and may be addressed and manipulated by using methods on those objects, typically using an application programming interface (API). Web browsers use layout engines to parse HTML into a DOM. Various DOM manipulation libraries exist that provide functionality for finding, selecting, and manipulating the DOM elements. An example of such a library is the j Query library.

A credential manager application seeking to assist users with entering credentials and other information into forms on a web page may use the DOM as it has been parsed by the web browser, instead of working with the HTML of the web page directly. This allows the credential manager application to take advantage of the HTML parsing already performed by the web browser.

Figure 1:
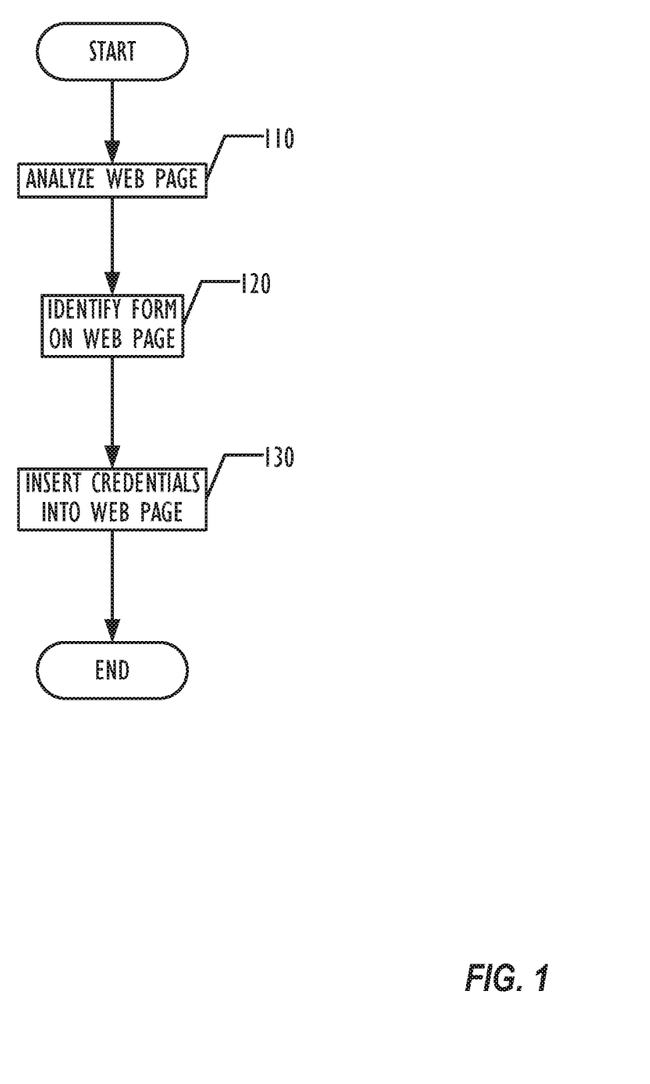
FIG. 1 is a flowchart illustrating a technique for inserting credentials into a web page y a credential manager according to one embodiment.

The credential manager application needs to insert previously stored credentials into forms defined on the web page. A simple example of this procedure is illustrated in FIG. 1. In block 110, the credential manager analyzes the web page. In block 120, the credential manager identifies one or more forms on the web page that are where credentials are to be entered into the web page. Finally, in block 130, the credential manager performs the insertion of the credentials into the form. A similar procedure may be used the first time a user accesses the web page, but instead of inserting credentials into the form, the credential manager may extract the credentials entered by the user into the form for later use.

These credentials forms may include login forms, forms for entering credit card information for a transaction, and any other form in which access to a resource is controlled by credentials that must be provided to access the resource. For clarity of the discussion below, login forms will be used as a representative example.

Much of the difficulty arises in block 120. Every web page may define its credential forms in any desired way, thus locating the relevant form on the web page may require considerable effort to allow the credential manager to provide a good user experience by correctly inserting credentials into the web page, allowing the user access whatever resources are protected by the credentials. In some cases, websites may split the entering of credentials, with some credentials entered on one web page and other credentials entered on other pages. For example, some websites request entry of a user name on a first web page, then upon successful entry, present a second web page that requests the user's password. Other web pages may include in the credential form fields that change every time the web page is presented. For example, some web sites use "Completely Automated Public Turing test to tell Computers and Humans Apart" (CAPTCHA) fields that provide a challenge response type of test that changes on every presentation of the form. A credential manager that filled in a CAPTCHA field with a previously used value and submitted the form would fail the challenge response test because the previously used value is no longer valid, likely annoying the user. In another example, a system that uses multi-factor identification may require entry of a one-time data value obtained from a token that generates the one-time data value for use in the form. As with the CAPTCHA case, a credential manager should not attempt to fill such a field or submit the credentials for authentication, since doing so without allowing entry of the proper one-time value will fail the authentication procedure.

With hundreds of millions of websites on the Internet, as well as on private networks, a credentials manager cannot create, much less maintain a catalog of every web page and its credential forms based on rules or other techniques. Instead, some credential managers may maintain a database of web pages that users have encountered previously, and may preload the database with information about popular web pages and their forms. Because those forms may change from time to time as the website owner modifies the web page, even a credential manager that maintains such a database should be able to discover a change in a previously analyzed web page and discover the new or modified web forms on the changed page, and preferably can make the stored information as robust as possible to minimize the likelihood that small changes to a web page would affect the credential manager's ability to fill forms on the page.

Although the credential manager could search through the HTML of the web page using heuristics to discover the fields of the relevant forms, a more efficient and effective approach is to use the DOM tree previously parsed by the web browser upon loading the web page. Doing so allows the credential manager to use methods provided by the DOM API in use for the web page to interact with objects in the DOM tree, such as the fields of the credentials forms. But the credential manager still needs to locate the relevant objects in the DOM tree and identify the type of field, then store that information for later use. For example, the credential manager may need to find the field to enter a username or userid, as well as a field for a password. Even though HTML provides a special "password" type of input field for entering passwords—allowing the browser to disguise or obfuscate the entered password instead of showing the actual password—the credential manager must still have a way to locate such fields in the DOM tree. In addition, there is no "user name" type of input field defined in HTML, so the field type is not sufficient to identify the field as a user name field. Furthermore, some web pages may have multiple fields of the same type, for example, a password change web page may have three password fields: one for entering the password to be changed, one for entering the new password, and one for entering the new password a second time for confirmation.

Figure 2:
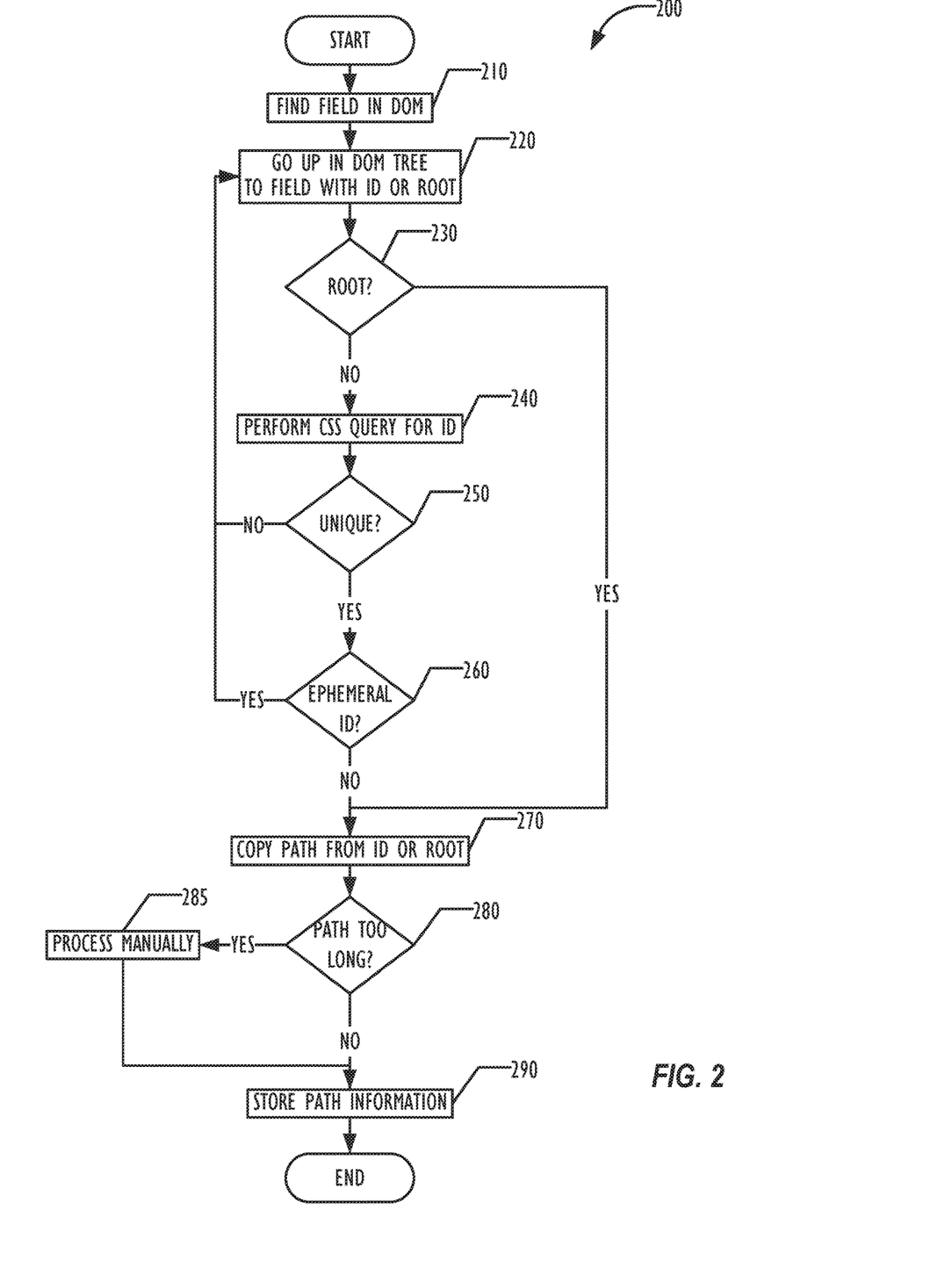
FIG. 2 is a flowchart illustrating a technique for identifying and storing information about credential fields according to one embodiment.

FIG. 2 is a flowchart illustrating a technique 200 for generating information for keeping track of the location of forms and fields in a web page according to one embodiment. In block 210, the credential manager application finds a relevant field in the DOM for the web page. Any desired technique for initially locating the field may be used, including scanning through the DOM tree for the web page looking for relevant fields. For example, DOM objects for a password field may be identified by a "type=password" attribute. User name fields typically have a "type=text" attribute, so that identification of the field may involve heuristic techniques such as looking for "userid" or "username" in the fields such as the name, title, class, autocomplete, placeholder, or value fields. In some embodiments, a credential manager system may use manual analysis, such as by employing crowd sourcing, to confirm that a credentials form field has been properly identified on a web page. Fields in the DOM tree may be selected using any type of query provided by the DOM API.

In some web pages, credential forms are not immediately present when the page is loaded, but may be added to the page based on a user action or other factors, including the passage of time. In one embodiment, the credential manager application may be able to recognize that a trigger action is required to present the credential form, and in addition to storing information about the credential form, store information about the trigger action and allow the credential manager to effect the trigger action to allow the credential form to be instantiated and filled. In one embodiment, the credential manager may be configured to wait for a short period before attempting to locate the credential form on the page, allowing time for the form to be instantiated on the page.

Some DOM objects that define login form fields may not be directly selectable because the DOM object does not have an "id" attribute value. In such a situation, in block 220 the credential manager may traverse the DOM tree upward to find an object having the "id" attribute, typically a <div> or <form> object, or the root of the DOM tree, typically a <body> object. If block 230, the credential manager determines whether the object found is the root of the DOM tree (a <body> object). If so, then a path through the tree from the <body> object to the field object may be used to locate the field in the web page in the future. While finding an object with the "id" attribute is preferable, because of the risk that changes to the web page may change the path from the root node of the DOM tree, the path from the root may be used.

If the object found is not the root node, a CSS query may be performed in block 240 using any desired form of CSS query to obtain the "id" attribute for the object. Although the DOM object model specification says that id attributes should be unique, malformed web pages may be created with objects having non-unique id attribute values. In one embodiment, to improve on the robustness of the approach, if in block 250 the "id" attribute is not unique and multiple objects are identified as having that id attribute value, then the object with the non-unique "id" attribute is not useful for defining a beginning of a path to the desired credential field. In such a situation, the credential manager may again move upward in the DOM tree to the next object having an "id" attribute, repeating blocks 220-250 until an object with a unique "id" attribute is located.

In some web pages, the "id" attribute of the object that is a candidate beginning of a path from that object to the login field may be a ephemeral value, as detected in block 260. The ephemeral value is typically generated for each access of the web page, thus changes with each access. As with objects with non-unique "id" attributes, an object with an ephemeral "id" attribute is therefore not useful as a value at the beginning of a path to the login field, because any value stored by the credential manager will generally not match the value of the "id" attribute for the path origin object in the future. Thus if the determination is made in block 260 that the "id" attribute is an ephemeral value, the procedure repeats blocks 220-260 until an objecting having a unique persistent or non-ephemeral "id" attribute or the root node is encountered.

Any desired technique may be used for determining whether the "id" attribute is an ephemeral value. In one example, pattern-matching techniques may be used to detect such ephemeral values heuristically, such as looking for "id" attribute values that contain a hyphen or dash followed by a string of digits. The patterns to be used may be determined empirically by examining web pages containing login forms.

Once an object is found with a unique non-ephemeral "id" attribute or the <body> object at the root of the tree is found, the path from that origin object to the desired field object may be copied in block 270, typically using functionality provided by the DOM API. As indicated above, an object with a unique non-ephemeral "id" attribute is preferable as a path origin over the <body> object, because changes in the path from the <body> object to the origin object may then change without affecting the ability to identify the desired login field, since a CSS query for the object with the origin "id" attribute may be selected wherever it exists in the DOM tree.

Although in many cases the path from the origin object to the login field may be very short (including a path that starts and ends at the object field), in some cases the path may be lengthy, going from through numerous levels of <div> sections along the path. In such a case, the path from original object to field is at increased risk of changes in that path that would prevent the path from being traversed in a future contact with the web page. In some embodiments, a path over a predetermined threshold length, e.g., 10 nodes long, may be flagged as too long in block 280 and sent for manual processing by a human being in block 285. Any desired threshold or relationship to the threshold may be used for determining that the path should be sent for manual processing.

Once an acceptable path is determined, the path may be associated with the credential field and stored in a credential manager database in block 290. This database, or a portion thereof, may be stored on the user's programmable device in one embodiment, but in another embodiment may be stored by a credential manager server remotely for use by multiple user devices having the credential manager application installed.

In addition to the "id" attributes and path information described above, in one embodiment the credential manager may extract other attribute information, such as the "name," "class," "autocomplete," or "placeholder" attributes, and use that attribute for finding credential fields in the login form as well as for identifying fields in the credential manager database.

The above procedure may be performed for every credential field that is identified in the web page. In most login pages, this will involve identifying a username or userid field and a password field. In pages that are used for resetting a password, three password fields may be found, one for the current password, one for the new password, and one for a confirmation of the new password. In one embodiment, the login form that includes the fields may be identified by a signature formed by the paths for all of the fields and their containers, and that login form signature may also be stored in the credential manager database. Where a login form that is used on multiple pages in a domain, this may allow the credential manager to use the knowledge of one web page in the domain for interacting with other web pages in the domain.

Figure 3:
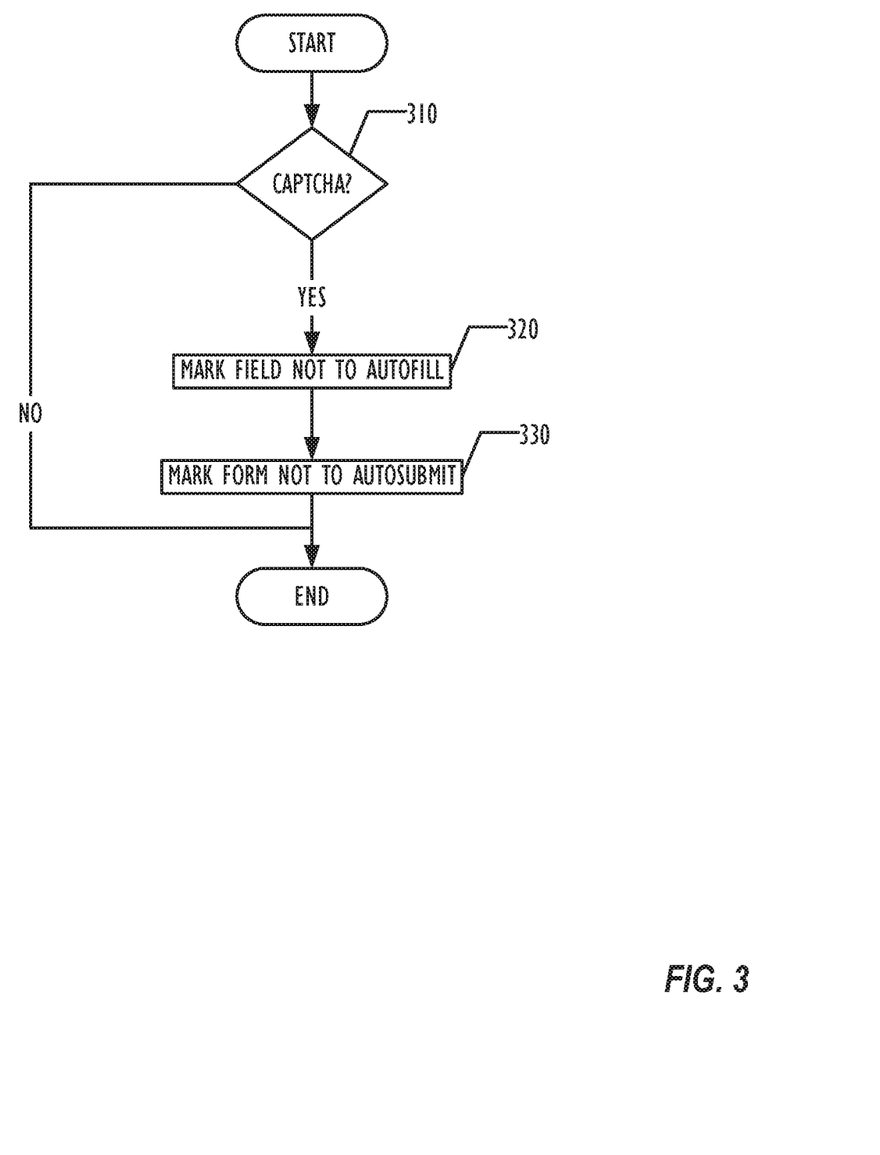
FIG. 3 is a flowchart illustrating a technique for processing ephemeral fields in a credential form according to another embodiment.

FIG. 3 is a flowchart illustrating a technique 300 that may be used by a credential manager identifying login forms according to one embodiment. There are a large number of web sites that use a challenge-response procedure in addition to providing credentials, at least in part to ensure that the data being submitted comes from a human being. One variety of these challenge-response procedures involves the use of CAPTCHAs or similar mechanisms in which the user is typically presented with an obfuscated text and asked to enter the obfuscated text. If the incorrect text string is provided, the login fails, even if the correct credentials have been provided. As stated above, the credential manager should not save these CAPTCHA fields and fill them on later access to the web page, nor should the credential manager attempt to auto-submit the credential form in such a scenario. In block 310, the credential manager determines whether a field identified on the page is a CAPTCHA field. If so, then the field in the login form is marked not to autofill in block 320 and in block 330 the form is marked not to autosubmit. Although described above in terms of CAPTCHAs, the same technique may be used on web pages that depend upon multi-factor authentication techniques such as tokens that generate a one-time value that is to be entered into a field of the login form.

Figure 4:
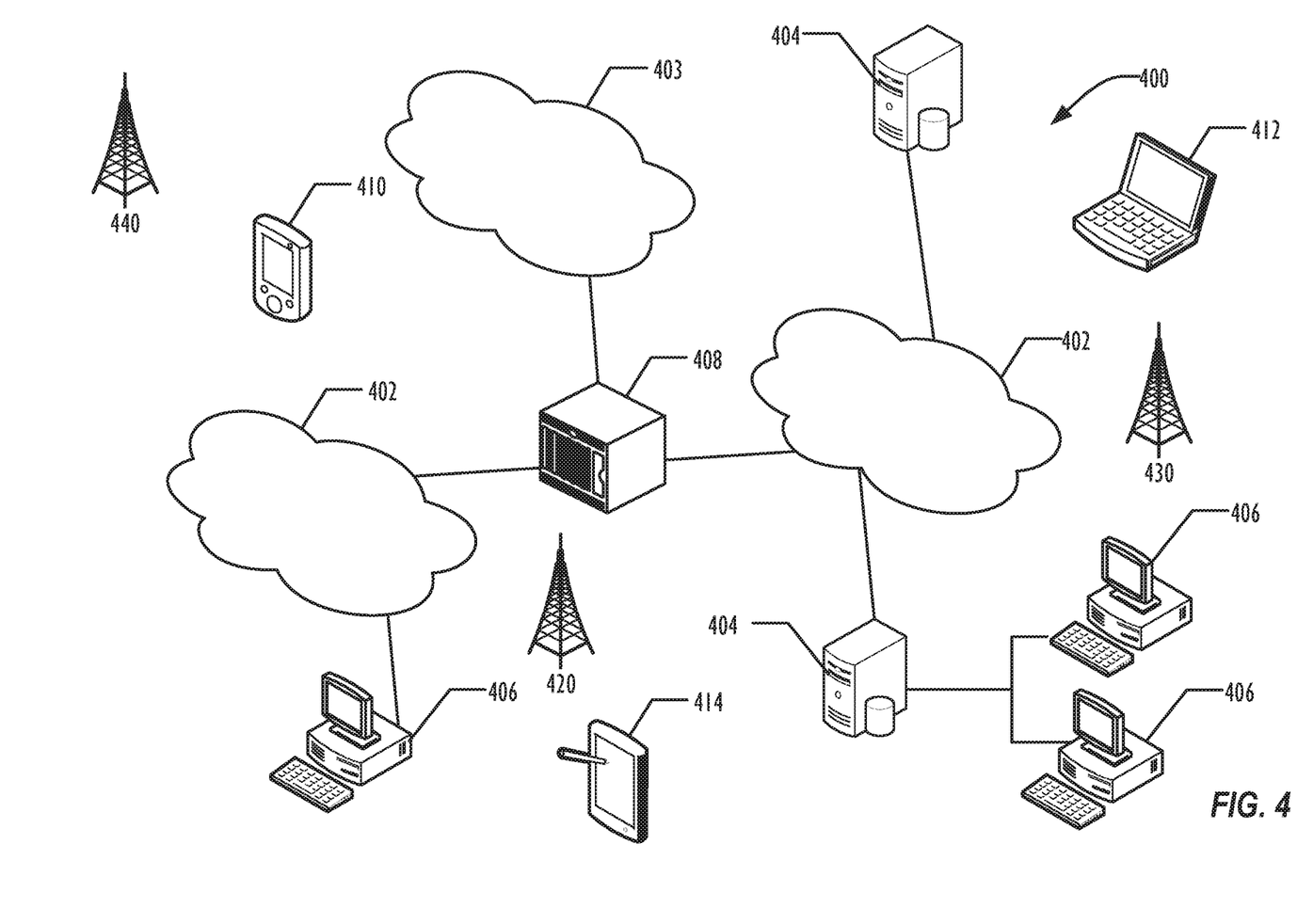
FIG. 4 is block diagram illustrating a computing infrastructure for implementing the techniques described herein according to one embodiment.

Referring now to FIG. 4, an example infrastructure 400 in which the techniques described above may be implemented is illustrated schematically. Infrastructure 400 contains computer networks 402. Computer networks 402 may include many different types of computer networks available today, such as the Internet, a corporate network or a Local Area Network (LAN). Each of these networks can contain wired or wireless programmable devices and operate using any number of network protocols (e.g., TCP/IP). Networks 402 may be connected to gateways and routers (represented by 408), end user computers 406, and computer servers 404. Infrastructure 400 also includes cellular network 403 for use with mobile communication devices. Mobile cellular networks support mobile phones and many other types of mobile devices. Mobile devices in the infrastructure 400 are illustrated as mobile phones 410, laptops 412 and tablets 414. A mobile device such as mobile phone 410 may interact with one or more mobile provider networks as the mobile device moves, typically interacting with a plurality of mobile network towers 420, 430, and 440 for connecting to the cellular network 403. Although referred to as a cellular network in FIG. 4, a mobile device may interact with towers of more than one provider network, as well as with multiple non-cellular devices such as wireless access points and routers 408. In addition, the mobile devices 410, 412 and 414 may interact with non-mobile devices such as computers 404 and 406 for desired services.

For example the credential manager application may be installed on any of the mobile devices 410, 412, or 414, while the credential manager database may be hosted by a credential manager server 404.

Figure 5:
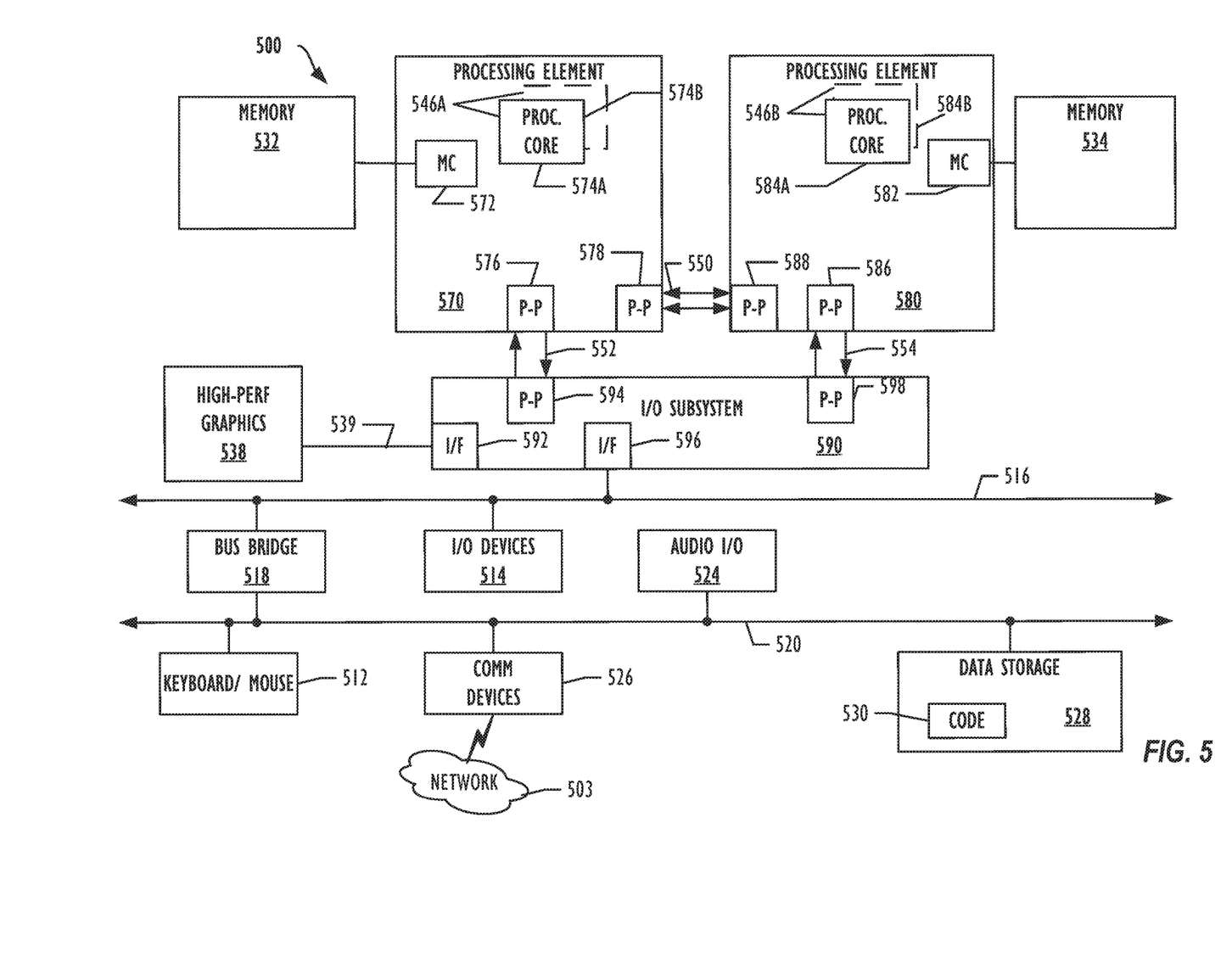
FIG. 5 is a block diagram illustrating a computing device for use with techniques described herein according to one embodiment.

Referring now to FIG. 5, a block diagram illustrates a programmable device 500 that may be used for implementing the techniques described herein in accordance with one embodiment. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Figure 6:
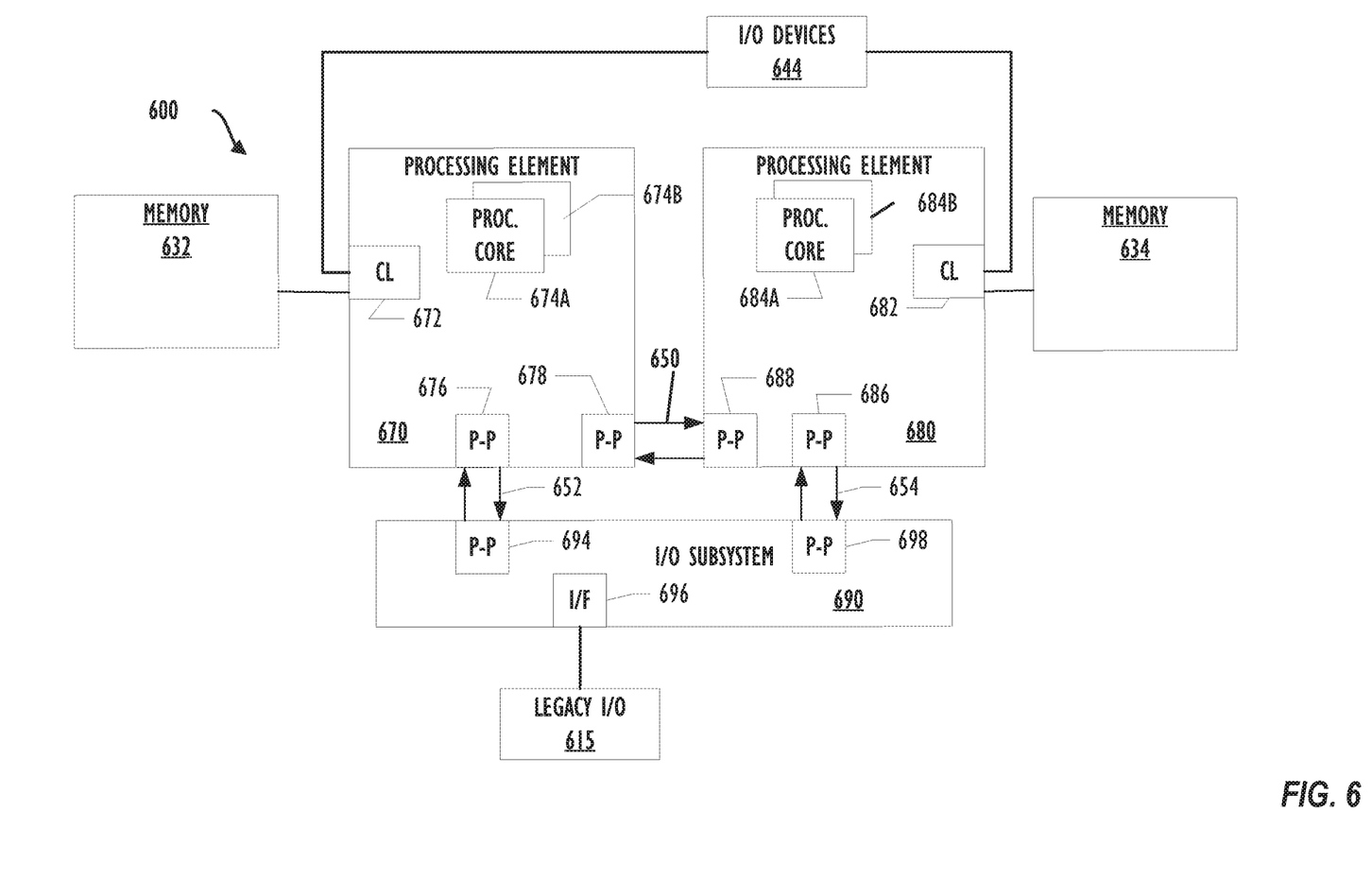
FIG. 6 is a block diagram illustrating a computing device for use with techniques described herein according to one embodiment.

Referring now to FIG. 6, a block diagram illustrates a programmable device 600 according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

The following examples pertain to further embodiments.

Example 1 is a machine readable medium, on which are stored instructions, comprising instructions that when executed cause a machine to: identify a first object associated with a credential field of a web page in a document object model object tree for the web page; determine a path from a unique origin object in the document object model object tree to the first object associated with the credential field; and associate the path with the credential field and store the path in a credential manager database.

In Example 2 the subject matter of Example 1 optionally includes wherein the instructions that when executed cause the machine to determine a path from a unique origin object comprise instructions that when executed cause the machine to: determine whether the first object has an attribute having a value unique in the document object model object tree; and traverse the document object model object tree upwards toward a root node until the unique origin object is found, wherein the unique origin object has an attribute having a value unique in the document object model object tree.

In Example 3 the subject matter of Example 2 optionally includes wherein the unique origin object is the root node.

In Example 4 the subject matter of any of Examples 1 or 2 optionally includes wherein the unique origin object has a non-ephemeral attribute value unique within the web page.

In Example 5 the subject matter of any of Examples 1 or 2 optionally includes wherein the instructions further comprise instructions that when executed cause the machine to: evaluate a length of the path; and send information about the web page, credential field, and path for manual processing if the length has a relation to a predetermined threshold value.

In Example 6 the subject matter of any of Examples 1 or 2 optionally includes wherein the instructions further comprise instructions that when executed cause the machine to: generate a signature for a credential form associated with the web page, the signature based at least in part on the path from the unique origin object.

In Example 7 the subject matter of any of Examples 1 or 2 optionally includes wherein the instructions further comprise instructions that when executed cause the machine to: determine that the credential field corresponds to a challenge-response functionality; and mark the credential field as a non-autofill field in the credential manager database.

In Example 8 the subject matter of any of Examples 1 or 2 optionally includes wherein the instructions further comprise instructions that when executed cause the machine to: mark a credential form associated with the credential field as a non-autosubmit field in the credential manager database.

Example 9 is a programmable device, comprising: one or more processors; a memory, coupled to the one or more processors, on which are stored instructions, comprising instructions that when executed cause at least some of the one or more processors to: identify a first object associated with a credential field of a web page in a document object model object tree for the web page; determine a path from a unique origin object in the document object model object tree to the first object associated with the credential field; and associate the path with the credential field and store the path in a credential manager database.

In Example 10 the subject matter of Example 9 optionally includes wherein the instructions that when executed cause at least some of the one or more processors to determine a path from a unique origin object comprise instructions that when executed cause at least some of the one or more processors to: determine whether the first object has an attribute having a value unique in the document object model object tree; and traverse the document object model object tree upwards toward a root node until the unique origin object is found, wherein the unique origin object has an attribute having a value unique in the document object model object tree.

In Example 11 the subject matter of Example 10 optionally includes wherein the unique origin object is the root node.

In Example 12 the subject matter of any of Examples 9 or 10 optionally includes wherein the unique origin object has a non-ephemeral attribute value unique within the web page.

In Example 13 the subject matter of any of Examples 9 or 10 optionally includes wherein the instructions further comprise instructions that when executed cause at least some of the one or more processors to: evaluate a length of the path; and send information about the web page, credential field, and path for manual processing if the length has a relation to a predetermined threshold value.

In Example 14 the subject matter of any of Examples 9 or 10 optionally includes wherein the instructions further comprise instructions that when executed cause at least some of the one or more processors to: generate a signature for a credential form associated with the web page, the signature based at least in part on the path from the unique origin object.

In Example 15 the subject matter of any of Examples 9 or 10 optionally includes wherein the instructions further comprise instructions that when executed cause at least some of the one or more processors to: determine that the credential field corresponds to a challenge-response functionality; and mark the credential field as a non-autofill field in the credential manager database.

In Example 16 the subject matter of any of Examples 9 or 10 optionally includes wherein the instructions further comprise instructions that when executed cause at least some of the one or more processors to: mark a credential form associated with the credential field as a non-autosubmit field in the credential manager database.

Example 17 is a method, comprising: identifying a first object associated with a credential field of a web page in a document object model object tree for the web page; determining a path from a unique origin object in the document object model object tree to the first object associated with the credential field; and storing the path in a credential manager database as associated with the credential field.

In Example 18 the subject matter of Example 17 optionally includes wherein determining a path from a unique origin object comprises: determining whether the first object has an attribute having a value unique in the document object model object tree; and traversing the document object model object tree upwards toward a root node until the unique origin object is found, wherein the unique origin object has an attribute having a value unique in the document object model object tree.

In Example 19 the subject matter of Example 18 optionally includes wherein the unique origin object is the root node.

In Example 20 the subject matter of any of Examples 17 or 18 optionally includes wherein the unique origin object has a non-ephemeral attribute value unique within the web page.

In Example 21 the subject matter of any of Examples 17 or 18 optionally includes further comprising: send information about the web page, credential field, and path for manual processing if a length of the path has a relation to a predetermined threshold value.

In Example 22 the subject matter of any of Examples 17 or 18 optionally includes further comprising: generating a signature for a credential form associated with the web page, the signature based at least in part on the path from the unique origin object.

In Example 23 the subject matter of any of Examples 17 or 18 optionally includes further comprising: determining that the credential field corresponds to a challenge-response functionality; and marking the credential field as a non-autofill field in the credential manager database.

In Example 24 the subject matter of any of Examples 17 or 18 optionally includes further comprising: marking a credential form associated with the credential field as a non-autosubmit field in the credential manager database.

Example 25 is an apparatus comprising: one or more processors; memory coupled to the one or more processors on which are stored instructions, comprising instructions that when executed cause at least some of the one or more processors to: identify a first object associated with a credential field of a web page in a document object model object tree for the web page; determine a path from a unique origin object in the document object model object tree to the first object associated with the credential field; and associate the path with the credential field and store the path in a credential manager database.

In Example 26 the subject matter of Example 25 optionally includes wherein the instructions that when executed cause at least some of the one or more processors to determine a path from a unique origin object comprise instructions that when executed cause at least some of the one or more processors to: determine whether the first object has an attribute having a value unique in the document object model object tree; and traverse the document object model object tree upwards toward a root node until the unique origin object is found, wherein the unique origin object has an attribute having a value unique in the document object model object tree.

In Example 27 the subject matter of Example 26 optionally includes wherein the unique origin object is the root node.

In Example 28 the subject matter of any of Examples 25 or 26 optionally includes wherein the unique origin object has a non-ephemeral attribute value unique within the web page.

In Example 29 the subject matter of any of Examples 25 or 26 optionally includes wherein the instructions further comprise instructions that when executed cause at least some of the one or more processors to: evaluate a length of the path; and send information about the web page, credential field, and path for manual processing if the length has a relation to a predetermined threshold value.

In Example 30 the subject matter of any of Examples 25 or 26 optionally includes wherein the instructions further comprise instructions that when executed cause at least some of the one or more processors to: generate a signature for a credential form associated with the web page, the signature based at least in part on the path from the unique origin object.

In Example 31 the subject matter of any of Examples 25 or 26 optionally includes wherein the instructions further comprise instructions that when executed cause at least some of the one or more processors to: determine that the credential field corresponds to a challenge-response functionality; and mark the credential field as a non-autofill field in the credential manager database.

In Example 32 the subject matter of any of Examples 25 or 26 optionally includes wherein the instructions further comprise instructions that when executed cause at least some of the one or more processors to: mark a credential form associated with the credential field as a non-autosubmit field in the credential manager database.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium, on which are stored instructions, comprising instructions that when executed cause a machine to:
    identify a first object in a first access to a web page, the first object associated with a credential field of a web page in a document object model object tree for the web page;
    in response to determining that the first object includes an ephemeral "id" attribute value, traverse the document object model object tree toward a root node until an identified object with an "id" attribute value that is not ephemeral is located;
    determine a path from the identified object in the document object model object tree to the credential field;
    store the path in a credential manager database;
    traverse the document object model from the identified object to the credential field according to the stored path to locate the credential field in the web page received during a second access; and
    populate the credential field with a stored credential from the credential manager database.

2. The non-transitory machine readable medium of claim 1, wherein the identified object has a non-ephemeral attribute value that is unique within the web page.

3. The non-transitory machine readable medium of claim 1, wherein the instructions, when executed, further cause the machine to:
    evaluate a length of the path; and
    send information about the web page, the credential field, and the path for manual processing if the length exceeds a predetermined threshold value.

4. The non-transitory machine readable medium of claim 1, wherein the instructions, when executed, further cause the machine to:
    generate a signature for a credential form associated with the web page, the signature based at least in part on the path from the identified object.

5. The non-transitory machine readable medium of claim 1, wherein the instructions, when executed, further cause the machine to:
  determine that the credential field corresponds to a challenge-response functionality; and
mark the credential field as a non-autofill field in the credential manager database.

6. The non-transitory machine readable medium of claim 1, wherein the instructions, when executed, further cause the machine to:
  mark a credential form associated with the credential field as a non-autosubmit field in the credential manager database.

7. A programmable device, comprising:
  one or more processors;
  a memory, coupled to the one or more processors comprising instructions that, when executed, cause the one or more processors to at least:
    identify a first object in a first access to a web page, the first object associated with a credential field of the web page in a document object model object tree for the web page;
    in response to determining that the first object includes an ephemeral "id" attribute value, traversing the document object model object tree toward a root node until an identified object with an "id" attribute value that is not ephemeral is located;
    determine a path from the identified object in the document object model object tree to the credential field;
    store the path in a credential manager database;
    traverse the document object model from the identified object to the credential field according to the stored path to locate the credential field in the web page received during a second access; and
    populate the credential field with a stored credential from the credential manager database.

8. The programmable device of claim 7, wherein the identified object has a non-ephemeral attribute value that is unique within the web page.

9. The programmable device of claim 7, wherein the instructions, when executed, further cause the one or more processors to:
  evaluate a length of the path; and
  send information about the web page, the credential field, and the path for manual processing if the length exceeds a predetermined threshold value.

10. The programmable device of claim 7, wherein the instructions, when executed, further cause the one or more processors to:
  generate a signature for a credential form associated with the web page, the signature based at least in part on the path from the identified object.

11. The programmable device of claim 7, wherein the instructions, when executed, further cause the one or more processors to:
  determine that the credential field corresponds to a challenge-response functionality; and
  mark the credential field as a non-autofill field in the credential manager database.

12. The programmable device of claim 7, wherein the instructions, when executed, further cause the one or more processors to:
  mark a credential form associated with the credential field as a non-autosubmit field in the credential manager database.

13. A method, comprising:
  identifying a first object in a first access to a web page, the first object associated with a credential field of the web page in a document object model object tree for the web page;
  in response to determining that the first object includes an ephemeral "id" attribute value, traversing the document object model object tree toward a root node until an identified object with an "id" attribute value that is not ephemeral is located;
  determining a path from the identified object in the document object model object tree to the credential field;
  storing the path in a credential manager database;
  traversing the document object model from the identified object to the credential field according to the stored path to locate the credential field in the web page received during a second access; and
  populating the credential field with a stored credential from the credential manager database.

14. The method of claim 13, wherein the identified object has a non-ephemeral attribute value that is unique within the web page.

15. The method of claim 13, further including:
  sending information about the web page, the credential field, and the path for manual processing if a length of the path exceeds a predetermined threshold value.

16. The method of claim 13, further including:
  generating a signature for a credential form associated with the web page, the signature based at least in part on the path from the credential field to the identified object.

17. The method of claim 13, further including:
  determining that the credential field corresponds to a challenge-response functionality; and
  marking the credential field as a non-autofill field in the credential manager database.

18. The method of claim 13, further including:
  marking a credential form associated with the credential field as a non-autosubmit field in the credential manager database.

* * * * *